United States Patent [19]

Long et al.

[11] Patent Number: 4,547,904
[45] Date of Patent: Oct. 22, 1985

[54] SURVIVAL SUIT

[75] Inventors: Richard W. Long; Robert T. Stinton, both of San Diego, Calif.

[73] Assignee: Diving Unlimited International, Inc., San Diego, Calif.

[21] Appl. No.: 441,068

[22] Filed: Nov. 12, 1982

[51] Int. Cl.⁴ .............................................. A62B 17/00
[52] U.S. Cl. ...................................... 2/2.1 R; 2/135; 2/DIG. 5
[58] Field of Search ................... 2/2.1 R, 135, DIG. 5

[56] References Cited

U.S. PATENT DOCUMENTS

| | | | |
|---|---|---|---|
| 3,513,825 | 5/1970 | Chun | 2/2.1 R |
| 3,725,173 | 4/1973 | Johnson et al. | 2/2.1 R |
| 3,771,169 | 11/1973 | Edmund | 2/2.1 R |
| 4,194,041 | 3/1980 | Gore et al. | 2/135 |

FOREIGN PATENT DOCUMENTS 0081850  6/1983  European Pat. Off. .......... 2/DIG. 5

Primary Examiner—Louis K. Rimrodt
Attorney, Agent, or Firm—Brown, Martin & Haller

[57] ABSTRACT

A wet type survival suit, particularly useful for oil rig workers or pilots and crew members stranded in water, includes an outer layer of material including a sheet of breathing material sandwiched between layers of fire protection material, a middle layer of insulation material that provides flotation, and an inner layer of fire protection material. This arrangement protects against fire, allows perspiration to evaporate, and allows the user to float in water. Suit adjusting laces are provided to adjust the suit to a comfortable configuration for the user. Zippers close the suit to a tight fit for use in water and can be loosened to reduce the restriction when desired.

10 Claims, 5 Drawing Figures

U.S. Patent   Oct. 22, 1985   Sheet 2 of 2   4,547,904
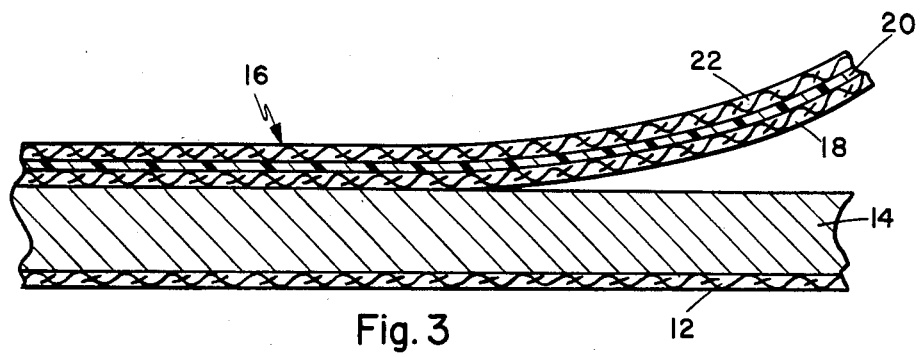
Fig. 3
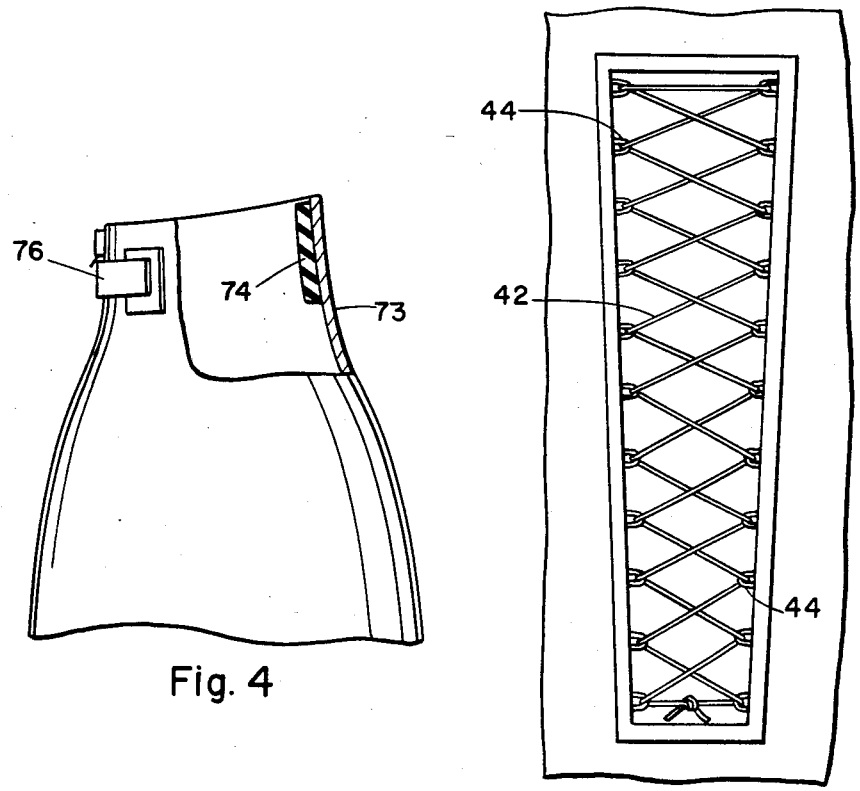
Fig. 4
Fig. 5

SURVIVAL SUIT

BACKGROUND

The present invention relates to a survival suit and particularly to a survival suit usable by people such as oil rig workers who work on platforms over the water and pilots and crew members of aircraft that fly over water, the suit being of the type commonly known as a "wet suit" in the underwater diving profession.

Pilots and crew members who fly over water have the problem of surviving when they are forced to ditch into the water. Oil rig workers have the problem when they fall off the rig into the water. This can be a severe problem in areas where the water temperature is extremely cold such as in the North Atlantic. Underwater diving suits known as "dry suits" have been tried. These suits are loose fitting suits with thermal underwear worn beneath. A dry suit can take on several gallons of water if it is punctured. The user then loses body heat rapidly to the surrounding water. The dry suit can be punctured during a crash landing in water. It can also be punctured during ejection from an aircraft due to the spray of lead particles that takes place when the ejection mechanism is actuated. Dry suits also have the disadvantage of becoming baggy and difficult to travel in if the survivor is attempting to engage in evasive tactics on land.

"Wet" suits have been more widely used because of the above problems with dry suits. A wet suit fits snugly and accepts a thin layer of water under the suit against the user's body. This thin layer of water does not dissipate the body heat of the user to a dangerous condition. Even if there is a puncture in the suit, the water over the user's body still is in a thin layer and does not pose a serious exposure problem. However, pilots and crew members do not like to wear wet suits because they do not "breathe". They fit snugly and when the user perspires, the perspiration cannot escape. This causes a very uncomfortable clamminess, severe discomfort and heat stress which affect the efficiency and judgment of the wearer.

A solution has been sought which would provide comfort to the wearer during flight and on land and also provide maximum protection against exposure in water.

SUMMARY

An exemplary embodiment of the present invention overcomes the prior art deficiencies with a construction comprising a wet type suit including material that permits the escape of water vapor and prevents the entry of liquid water into the suit, insulating and flotation means in the suit, adjusting means in the suit for adjusting the suit to the desired fit on the user, and opening means in the suit that can be opened to relieve the restriction of the suit on the user and that can be closed to provide a watertight seal.

DESCRIPTION OF THE DRAWINGS

FIG. 3 is an enlarged sectional view taken on line 3—3 of FIG. 2, showing the laminated fabric typical of most of the suit construction.

FIG. 4 is an enlarged side elevation view of the neck, with a portion cut away.

FIG. 5 is an enlarged view in the direction of arrows 5—5 in FIG. 1.

DETAILED DESCRIPTION OF THE INVENTION

Figures 1, 2:
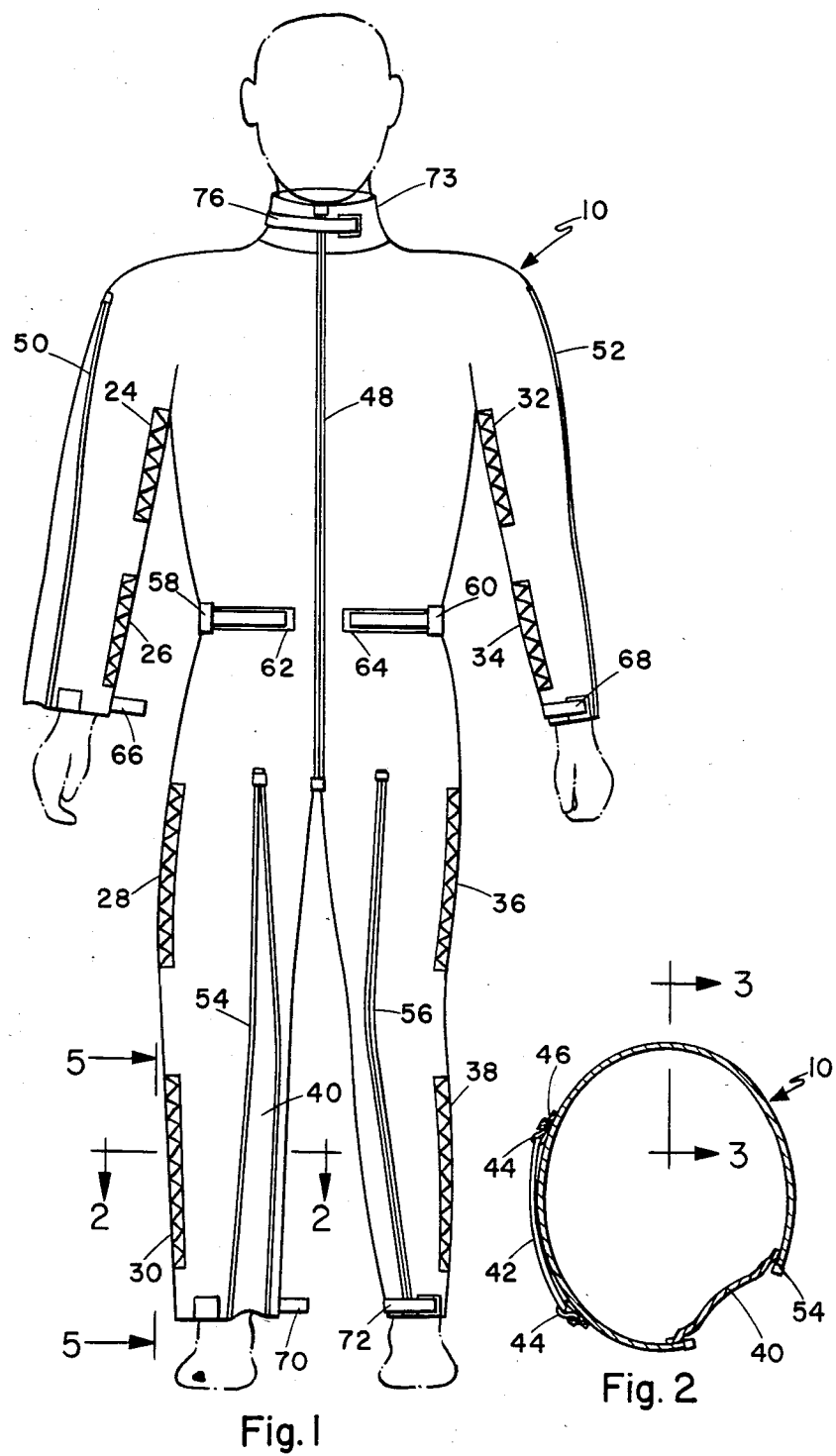
FIG. 1 is a front view of a typical survival suit incorporating the novel structure of the present invention.
FIG. 2 is an enlarged sectional view taken on line 2—2 of FIG. 1.

The survival suit of the present invention will be discussed in the context of a pilot who is required to fly at least part of the time over water. It is to be understood that this is helpful in understanding the use of the survival suit but that the suit is not limited to these circumstances.

The survival suit of the present invention is indicated at 10 in FIG. 1 of the drawings. Referring to FIG. 3 of the drawings, the suit includes an inner layer 12 of material such as Nomex produced by Dupont, which does not melt to a sticky substance under heat but instead creates an ash much like burned paper. For example, nylon melts at 300° F. and forms a sticky substance which can create a hot spot. Nomex forms a substance like paper ash at 600° F. This type of material is defined herein as a "dry destruct" material. It reduces the chance of severe burns to the suit user when there is excessive heat such as the condition during a fire.

A second layer 14 of insulating material is positioned on the inner layer 12. A material produced by 3M Company under the name "Thinsulate" using polypropylene microfibers has been found particularly useful. This material produces good temperature insulation with a thin sheet of material because of its ability to maintain air space when immersed in water. This material also provides flotation for the user to prevent him from submerging and drowning.

An outer layer 16 of material is positioned over the second layer. This outer layer 16 includes a first sheet 18 of Nomex, a second sheet 20 of material of the type produced under the trademark Goretex by A. E. Gore Company, and a third sheet 22 of Nomex or nylon. These sheets are bonded together. Goretex is a material that will pass water vapor but that will not pass liquid water. The three layers 12, 14 and 16 are sewn together at the seams and then sealed by means of sealing tape.

A suit with this construction permits perspiration vapor to pass from inside the suit through the Goretex sheet 20 to the outside atmosphere and avoids the discomfort normally caused by this type of suit. A pilot in closely confined quarters finds this to be an important advantage. The Nomex layers 12, 18 and 22 provide maximum protection against fire and if they are subjected to very high temperatures, do not cause a sticky residue which concentrates heat. The insulating layer 14 also provides heat insulation for the suit user.

The suit 10 is a snugly fitting suit when worn in the water to provide maximum protection against exposure when a person such as a pilot finds it necessary to abandon his aircraft and ends up in the water. Water cannot flow and slosh in the suit. This snugness causes restriction of movement and discomfort when the pilot is wearing the suit in the aircraft. The suit of the present invention provides means for relieving this condition. Adjusting means in the form of a lace arrangement is shown along the arms and legs of the suit 10 at locations 24–38. One such lace arrangement 30 is shown in detail in FIGS. 2 and 5 of the drawings. A lace 42 passes through cloth loops 44 attached to a border 46 affixed to the suit 10. These lace arrangements are adjusted as described hereinafter. FIG. 2 shows the gusset 40 attached to suit 10 adjacent the sections of zipper 54. All the arm and leg zippers include such a gusset.

The suit 10 also includes a two-way zipper 48 in the front of the torso of the suit. The zipper 48 can be moved up from the bottom for a relief function and can be moved down from the top to don the suit 10. Two arm zippers are shown at 50 and 52. The right arm zipper 50 of the suit is shown open in FIG. 1. Two leg zippers 54 and 56 are positioned on the legs of the suit. The zipper 54 on the right leg of the suit is shown open in FIG. 1. These zippers are positioned so that they do not lie over the knee portion of the suit and hamper movement.

When the user dons the suit, he closes all of the zippers and then the lace arrangements 24–38 are laced to the desired fit and the laces are tied to themselves in the adjusted position. The user now has a suit that fits him. When he is in flight, he can open any or all of the zippers 50–56 to reduce the restriction. Now he has a suit that breathes and he also has a suit which can be adjusted to avoid uncomfortable restriction. By closing the zippers, the pilot has a wet suit that provides maximum protection against exposure, particularly in water. He also has a suit that fits him correctly, because of the lace arrangements, if he is on land and needs to be able to move readily and take evasive action.

The suit 10 also includes a waist adjusting means in the form of a pair of straps 58 and 60 with Velcro on the ends that fasten to Velcro pads 62 and 64. Velcro strap and pad arrangements are also provided at 66, 68 at the wrists and 70, 72 at the ankles of the suit 10 for adjustment to prevent water from seeping into the suit. The neck 73 of the suit is lined with wet suit rubber 74 (FIG. 4) and the neck portion of the suit is sealed with the Velcro strap and pad arrangement 76.

The suit is useful as a uniform for oil rig workers. It affords comfort, weather protection, and a survival medium. It is a wet suit type of survival suit that is particularly effective in the water, that provides flotation, and that is unusually comfortable when worn out of the water. The suit is adjustable to the user's size and the user can move effectively in the suit when on land.

Having thus described out invention, we claim:

1. A survival suit for protecting the user from exposure to dangerous conditions including exposure in water, comprising:
    a suit including arm, leg and torso portions made of a material that passes water vapor and that does not pass liquid water;
    access means in the torso of said suit for facilitating donning and removal of the suit when open and for providing a water tight seal when closed;
    means for adjusting the arm and leg portions of said suit to fit snugly around the arms and legs of the user; and
    openings in the arm and leg portions of said suit for easing the restriction of the arms and legs of the user by the arm and leg portions of said suit and closable separately from the adjusting means by closure means for providing a watertight seal.

2. A survival suit material according to claim 1 wherein the suit includes dry destruct material that does not accumulate to form hot spots when subjected to high temperatures.

3. A survival suit according to claim 1 wherein the suit material includes a layer of insulation material that provides temperature insulation and flotation for the user.

4. A survival suit according to claim 1 wherein adjusting means is provided at the waist of said suit.

5. A survival suit according to claim 1 wherein adjusting and sealing means is provided at the neck of said suit.

6. A survival suit according to claim 1 wherein sealing means is provided at the wrist and ankle portions of said suit.

7. A survival suit according to claim 1 wherein the suit material includes a layer having a sheet of material that passes water vapor but that does not pass liquid water sandwiched between sheets of material, at least the inner sheet being dry destruct material.

8. A survival suit according to claim 7 wherein a sheet of insulating material is positioned beneath said layer.

9. A survival suit according to claim 8 wherein a sheet of dry destruct material is positioned beneath said sheet of insulating material.

10. A survival suit for protecting the user from exposure to dangerous conditions including exposure in water, comprising:
    an outer layer including a first sheet of a material that passes water vapor and that does not pass water, a sheet of a dry destruct material positioned beneath said first sheet, and a sheet of a protective material positioned on top of said first sheet;
    a middle layer of a temperature insulation and flotation material;
    an inner layer of a dry destruct material;
    access means in a torso of said suit for facilitating donning and removal of the suit when open and for providing a watertight seal when closed;
    adjusting means in said suit for adjusting said suit so that it fits snugly on the user; and
    openings in said suit for easing the restriction of the user by said suit and closable by closure means for providing a watertight seal.

* * * * *

UNITED STATES PATENT AND TRADEMARK OFFICE
CERTIFICATE OF CORRECTION

PATENT NO. : 4,547,904
DATED : October 22, 1985
INVENTOR(S) : Richard W. Long and Robert T. Stinton It is certified that error appears in the above-identified patent and that said Letters Patent is hereby corrected as shown below:

Column 4, line 9, Claim 2, after the word "suit" delete "material".

Column 4, line 10, Claim 2, after the word "suit" insert --material--.

Signed and Sealed this

Twenty-first Day of April, 1987

Attest:

DONALD J. QUIGG

Attesting Officer

Commissioner of Patents and Trademarks